(12) United States Patent
Weber et al.

(10) Patent No.: US 12,014,334 B2
(45) Date of Patent: Jun. 18, 2024

(54) SYSTEM FOR IMPROVED VEHICULAR MAINTENANCE SCHEDULING

(71) Applicant: FORD GLOBAL TECHNOLOGIES, LLC, Dearborn, MI (US)

(72) Inventors: Patrick Weber, Ann Arbor, MI (US); Michael Martinez, Westland, MI (US); Brandon Heeg, Rochester Hills, MI (US); Kelsey Schmitz, Boston, MI (US); James Austin Turner, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 900 days.

(21) Appl. No.: 15/618,596

(22) Filed: Jun. 9, 2017

(65) Prior Publication Data

US 2018/0357612 A1    Dec. 13, 2018

(51) Int. Cl.
    *G06Q 30/06*      (2023.01)
    *G06Q 10/20*      (2023.01)
    *G06Q 30/0601*    (2023.01)

(52) U.S. Cl.
    CPC ......... *G06Q 10/20* (2013.01); *G06Q 30/0633* (2013.01)

(58) Field of Classification Search
    CPC ..... G06Q 30/06; G06Q 30/0633; G06Q 10/20
    USPC .............................................. 705/26.1–27.2
    See application file for complete search history.

(56) References Cited

U.S. PATENT DOCUMENTS

2015/0254719 A1   9/2015  Barfield, Jr. et al.
2016/0035150 A1*  2/2016  Barfield, Jr. ........... G07C 5/008
                                                  701/29.3

OTHER PUBLICATIONS

Tseng, F. F. (2016). Evolving clustering algorithms and their application for condition monitoring, diagnostics, & prognostics (Order No. 10246358). Available from ProQuest Dissertations and Theses Professional. (1885003327). Retrieved from https://dialog.proquest.com/professional/docview/1885003327?accountid=1314.*

* cited by examiner

*Primary Examiner* — Jeffrey A. Smith
*Assistant Examiner* — Jennifer V Lee
(74) *Attorney, Agent, or Firm* — Joseph Zane; Brooks Kushman P.C.

(57) ABSTRACT

A system includes a processor configured to wirelessly receive vehicle usage data. The processor is also configured to aggregate received data over time. The processor is further configured to classify vehicle usage into a predetermined category based on the aggregated received data. Also, the processor is configured to access a set of maintenance recommendations associated with the predetermined category and send a maintenance recommendation based on a correspondence between the aggregated data and a value associated with one of the maintenance recommendations.

10 Claims, 5 Drawing Sheets

SYSTEM FOR IMPROVED VEHICULAR MAINTENANCE SCHEDULING

TECHNICAL FIELD

The illustrative embodiments generally relate to methods and apparatuses for improved vehicular maintenance scheduling.

BACKGROUND

Customers often dread having to take an afternoon to go get a vehicle serviced. Between the expenditure of time, possible identification of further problems, and the general expectation of being sold products and services that are not actually needed, public opinion about visiting a dealership for maintenance is at a fairly low level. Further, many people simply do not understand that their vehicles benefit from regular maintenance, and that dealer recommendations are often provided to prevent much larger future costs from being incurred.

In a typical visit to a dealer for maintenance, the customer makes an appointment and then spends 5-15 minutes interacting with a check-in person when the customer arrives for service. The check-in process is often tedious, requiring the employee to navigate multiple screens of an outdated computer system, and eventually resulting in a seemingly generic set of maintenance recommendations.

Further, while maintenance recommendations are generally tailored for vehicles, or a class of vehicles, as a whole, a one-year service appointment could be tailored much differently on a per vehicle basis, if the actual usage and driving conditions under which the usage occurred were considered by the dealer. Since the dealer typically does not have this information available, they are left with the unhappy prospect of either spending 10 minutes questioning a customer who would prefer not to spend significant time at the dealer or simply providing a generic and standard set of recommendations for the customer to consider.

SUMMARY

In a first illustrative embodiment, a system includes a processor configured to wirelessly receive vehicle usage data. The processor is also configured to aggregate received data over time. The processor is further configured to classify vehicle usage into a predetermined category based on the aggregated received data. Also, the processor is configured to access a set of maintenance recommendations associated with the predetermined category and send a maintenance recommendation based on a correspondence between the aggregated data and a value associated with one of the maintenance recommendations.

In a second illustrative embodiment, a system includes a processor configured to wirelessly receive a set of maintenance recommendations from a manufacturer server. The processor is also configured to present a display of the received maintenance recommendations in a selectable manner, the display also including representation of vehicle usage classification. The processor is further configured to receive selection of a maintenance recommendation from the display and send data indicating the selected maintenance recommendation to a preferred dealer.

In a third illustrative embodiment, a system includes a processor configured to wirelessly receive a set of maintenance recommendations from a manufacturer server, including a vehicle identifier. The processor is also configured to wirelessly receive a customer selection of the maintenance recommendations from a vehicle corresponding to the vehicle identifier and automatically order any parts needed to service the selected maintenance recommendations.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
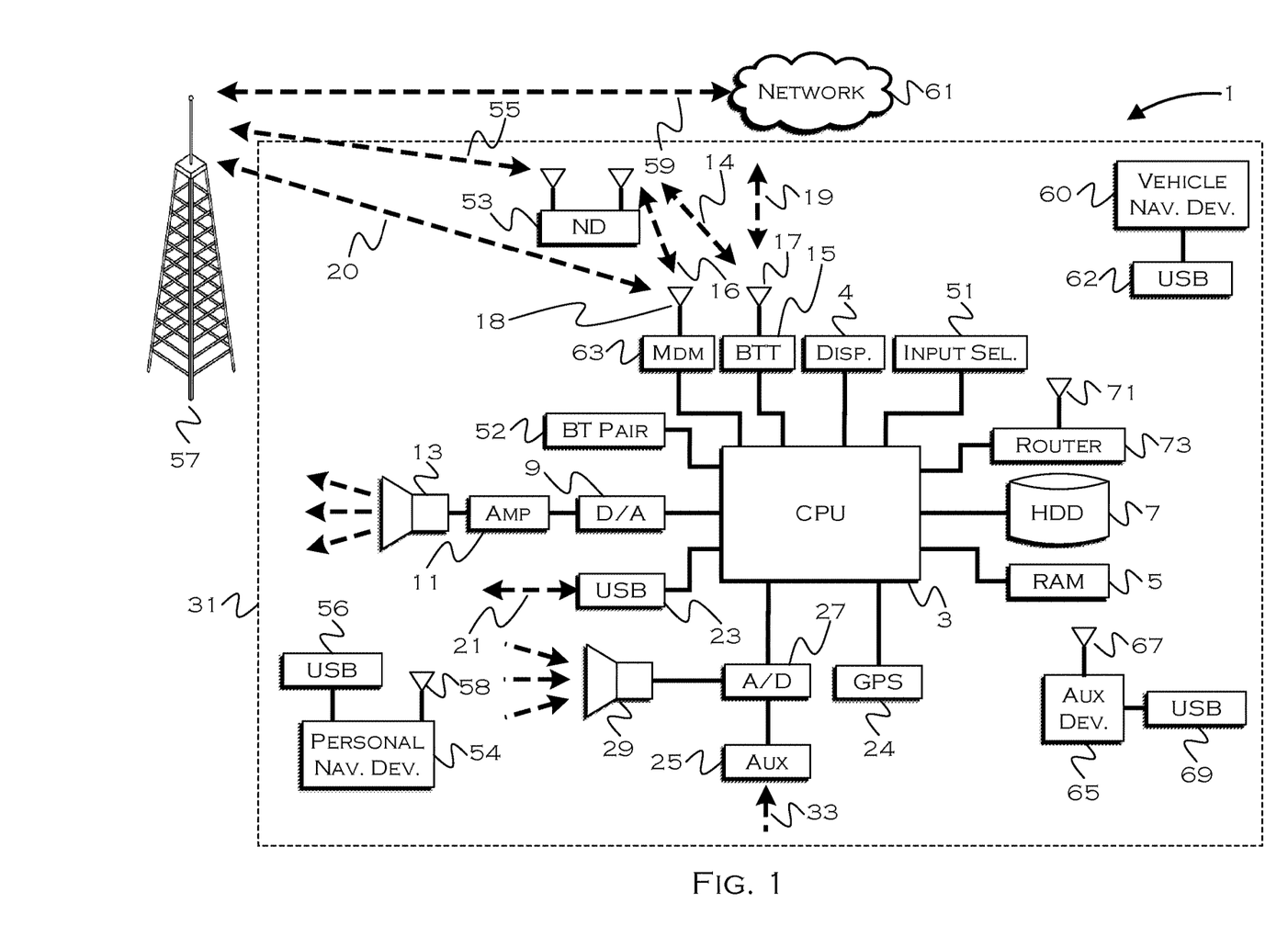
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments provide methods and apparatuses to assist in providing more targeted maintenance suggestions for particular vehicles. In many cases, it still makes sense to treat a vehicle as a part of a "group," but it does not necessarily make sense to treat, for example, all 2018 FORD EXPLORERS as a single group of vehicles, for maintenance recommendation purposes.

Somewhere between a highly tailored maintenance recommendation and a largely generic maintenance recommendation is a maintenance recommendation that has aspects of both. Suggestions can be highly tailored to a specific vehicle's particular components, but they can be tailored based on observations made about a select group of vehicle which were driven under similar conditions.

For example, instead of saying that "all 2018 FORD EXPLORERS should have their air filters replaced after one year," it might be reasonable to say that "all 2018 FORD EXPLORERS experiencing moderate or higher usage in normal climates, or light or higher usage in dusty climates, should have their air filters replaced after one year." While this example is purely illustrative, if "moderate" usage were defined as "driven 5 days a week or more" or "driven for 9000 miles or more" and if "light" usage were defined as "driven 3 days a week or more" or "driven for 6000 miles or more" then the dealership could provide a recommendation that was not universally applicable to all 2018 FORD EXPLORERS regardless of use or locale. Further, the dealer could even provide a reason for the recommendation "your vehicle appears to have been lightly used, but since you were primarily driving in dusty climates, we recommend replacement of the air filter." This demonstrates a personal aspect to the recommendation, even if the recommendation is otherwise largely generic for all lightly used vehicles driven in dusty climates.

By modeling vehicles based on measured usage characteristics and traits that are likely to cause maintenance needs, custom models for selective groupings of vehicles can be built that both provide a level of customization for an owner while not requiring an on-site mechanic to disassemble a portion of the engine to determine actual, vehicle-specific needs. Using inference (e.g., 90% of vehicles having N usage under M conditions), the dealer can reasonably assume and recommend certain maintenance, and the customer can actually benefit from the directed maintenance.

And, although not the preferred result, the customer ignoring the maintenance recommendation may be statistically more likely to experience an actual problem that would have been prevented by the maintenance. Actually experiencing some problems will help build reliance that the dealer is actually recommending services that matter, although, of course, it is better for the customer if they simply accept the recommendation in the first place. By providing a reason for the recommendation that appears to be vehicle-tailored, the dealer can hopefully encourage the customer not to simply ignore the recommendation, figuring "that really does not apply to me."

The illustrative embodiments propose examples of an Intelligent Maintenance Tool (IMT) that connects the maintenance scheduling services of customer interfaces with an original equipment manufacturer (OEM) Scheduled Maintenance Tool (SMT) and a dealership's interface.

Dealerships currently use SMT to provide service recommendations based on manual inputs by a representative at the time a customer arrives at the dealership for a service appointment. These manual inputs include a vehicle's VIN, past service history, current odometer, and selection of a driver profile based on the representative's limited knowledge of the vehicle's use and customer's driving habits. This can be an inconvenient, time-consuming process for both the customer and representative.

While SMT may be a recommended tool for dealerships to use when scheduling maintenance service appointments, the SMT may result in an extremely low percentage of dealership repair orders. An illustrative vehicle usage application takes advantage of available vehicle data sets (via the IMT) in order to optimize SMT features for the consumer and dealership experience, and increase revenues for dealerships and OEMs.

In one example, a vehicle usage application uses unsupervised clustering, supervised classification machine learning algorithms and large, connected vehicle data sets, to enhance the quality, speed and transparency of dealer service recommendations via SMT.

In this example, eight parameters are used for vehicle usage classification, which include: 1) Mean Engine Speed; 2) Engine Speed Standard Deviation; 3) Mean Vehicle Speed; 4) Vehicle Speed Standard Deviation; 5) Mean Accelerator Pedal Position; 6) Accelerator Pedal Position Standard Deviation; 7) Mean Oil Life Slope; and 8) Oil Life Slope Deviation.

For example, oil life from an intelligent oil life monitor in vehicles can be used as a proxy to capture higher frequency events not reported by a normal modem equipped vehicle transmission rate, as modem equipped vehicles only report approximately every 5 minutes, whereas an oil life monitor may be running on-vehicle continuously.

Examination of oil life data can demonstrate how more aggressive driving yields enhanced oil life usage per mile driven, meaning, based on this observation, that an aggressive driver driving 3000 miles may need an oil change more urgently than a cautious driver driving the same number of miles.

|  | Engine Speed | | Vehicle Speed | | Pedal Position | | Oil Life | | |
| --- | --- | --- | --- | --- | --- | --- | --- | --- | --- |
|  | Mean | Std. Dev | Mean | Std. Dev | Mean | Std. Dev | Mean | Std. Dev | |
| Avg. | 1718 | 612 | 29.1 | 16.3 | 12.3 | 13.4 | 9.24E−07 | 3.29E−07 | Light |
| Std. Dev. | 184 | 94 | 8.2 | 1.6 | 3.5 | 2.6 | 9.89E−08 | 5.06E−08 | |
| Avg. | 2213 | 611 | 55.2 | 20.1 | 21.1 | 15.7 | 1.19E−06 | 3.28E−07 | Normal |
| Std. Dev. | 233 | 139 | 3.8 | 1.3 | 7.1 | 3.8 | 1.25E−07 | 7.46E−08 | |
| Avg. | 2448 | 1062 | 44 | 17.6 | 27.7 | 30.4 | 1.32E−06 | 5.71E−07 | High |
| Std. Dev. | 486 | 125 | 15.4 | 1 | 13.3 | 6.4 | 2.61E−07 | 6.73E−08 | |

The preceding table demonstrates some illustrative vehicle system measurements that have been correlated to various usage categories (light, normal, high). Additional data can be measured, such as, but not limited to, time spent off-road driving and experienced dust levels. This data can refine certain recommendations, but may not matter for other recommendations. Using a defined set of measurable vehicle data, drivers can be classified into finite sub-categories and a dealer can provide specific recommendations for a given category without having to spend significant time examining a particular vehicle to determine the precise maintenance needs of that vehicle. In many instances, a customer would not want to wait around for hours while the dealer examined every bit and piece of the vehicle that could need repair or replacement, and a classification of the vehicle that statistically represents expected customer needs is suitable for all parties involved.

Figure 2A:
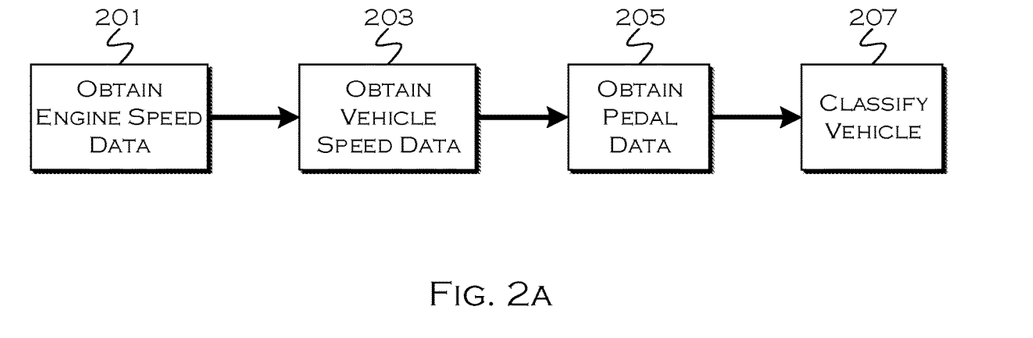
FIG. 2A shows an illustrative example of data gathering and classification for a vehicle.

FIG. 2A shows an illustrative example of data gathering and classification for a vehicle. A remote system, or an onboard vehicle computer, can gather 201 engine speed data, gather 203 vehicle speed data, and gather 205 pedal position data. This data can be compared to models to generally classify the vehicle, as shown in the example table above. The vehicle may gather the data while the vehicle drives and report the data periodically (if the data is needed for modeling purposes, for example) or when maintenance is requested (for remote comparison to existing modeling data). The remote system, such as the IMT, can classify 207 the vehicle and report the classification to the SMT on the dealer-side.

Figure 2B:
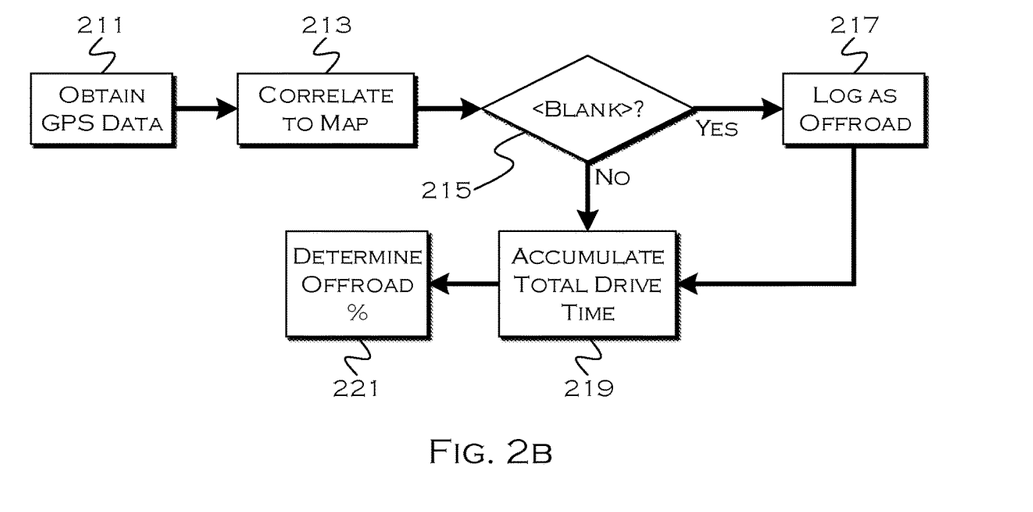
FIG. 2B shows an illustrative example of additional data gathering.

FIG. 2B shows an illustrative example of additional data gathering, in this case corresponding to off-road conditions. In this example, the process logs GPS data and uses correlation between GPS and known road coordinates to determine an off-road state. While the vehicle could gather data perpetually or at very short intervals, the vehicle may also use a state transition to switch between on road and off-road conditions and back, and simply log mileage or travel time during the swapped states.

In this example, the process obtains 211 GPS data and compares 213 the data to map data to determine if the current coordinates still correspond to a known road. If the known road is determined 215 to be "<blank>," indicating that no known road is present, the process can log 217 any time under this condition as "off-road" driving and track 219 total "off-road" drive time. If the vehicle crosses back onto a road, or if the vehicle never left a known road, the process can log 219 the drive time as "normal" drive time. The process can calculate 221 off-road time as a percentage of off-road to total drive time (normal+off-road) at any time the calculation is needed. This is just one example of how off-road driving or any other anomalous driving state/condition could be calculated.

Figure 2C:
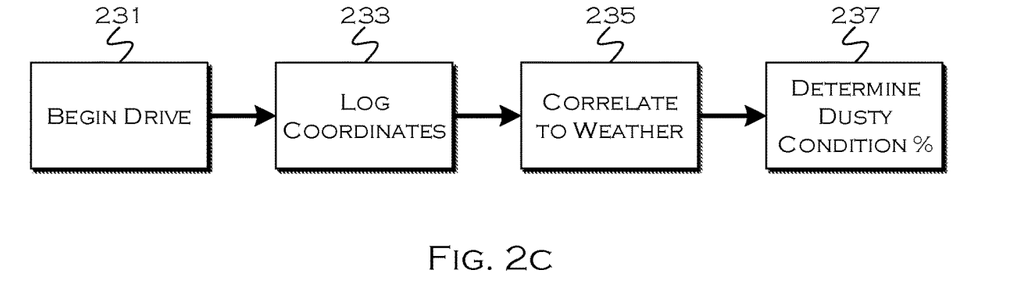
FIG. 2C shows an illustrative example of a dusty condition recordation process.

FIG. 2C shows an illustrative example of a dusty condition recordation process. In one example, data can be gathered as with respect to FIG. 2B, if areas qualifying as perpetually dusty are defined by known coordinates. In that case, the process simply replaces the state transition from on-road to off-road with a state transition from non-dusty to dusty and can record and track the data in the same manner.

Many dusty regions, however, are not perpetually dusty. Unless a driver lives or drives regularly in a desert, there is a high chance that the driver will only encounter dusty conditions on a limited basis. This process recognizes 231 when a drive begins and logs 233 coordinates over the course of the drive. The process can then correlate 235 these coordinates to known weather or environmental conditions (which can include dusty, for example). This allows the process to determine 237 a percentage of time or distance during which the vehicle operated under dusty conditions (which may be indicative of certain types of accelerated wear). Modifications for other outcome-affecting weather conditions could be made (e.g., the same model could be used to track driving in heavy rain, snow, etc).

Figure 3:
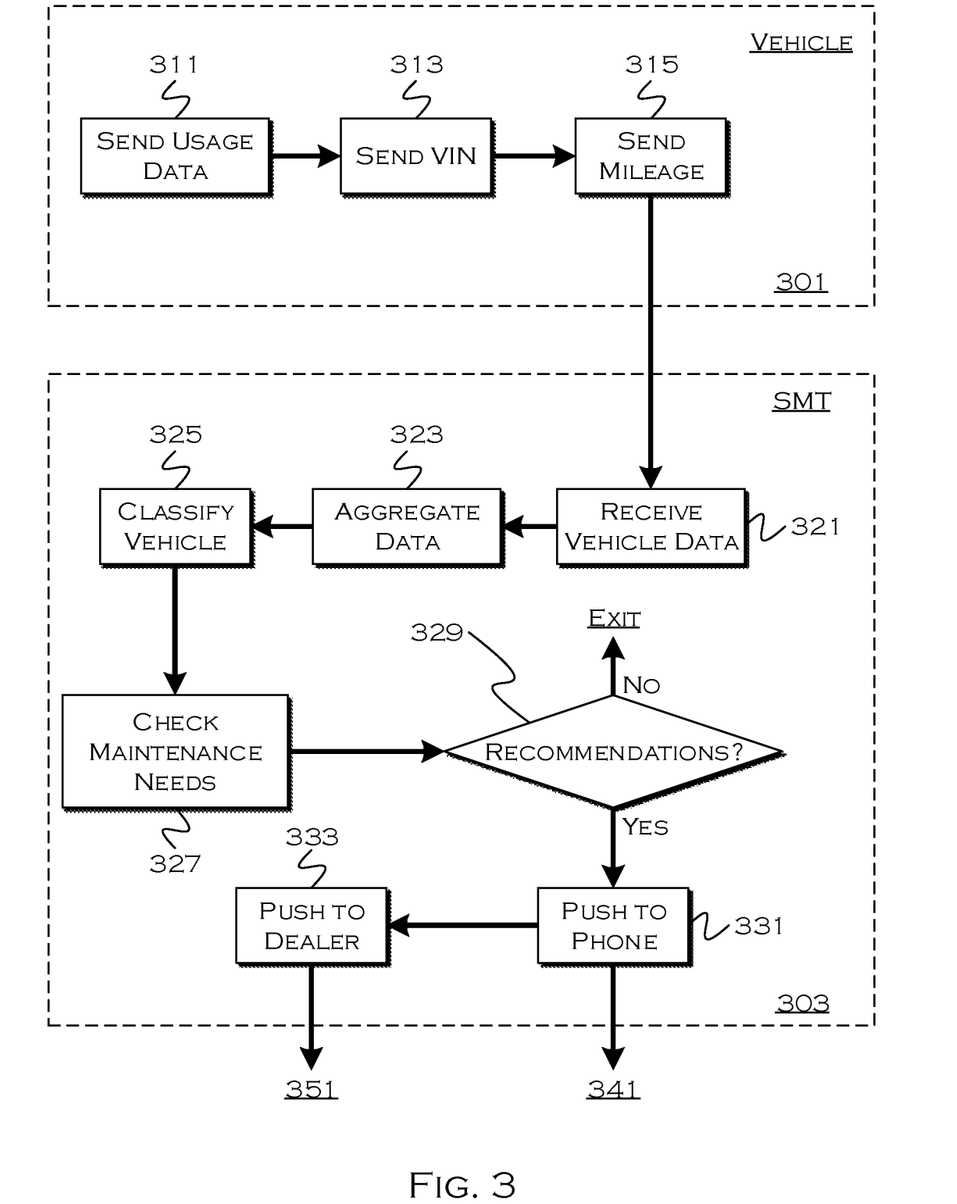
FIG. 3 shows an illustrative example of processes interacting to provide maintenance recommendations.

FIG. 3 shows an illustrative example of processes interacting to provide maintenance recommendations. In this example, the vehicle 301 gathers and sends 311 usage data (as above in FIGS. 2A-2C, for example), sends 313 vehicle identification (such as a VIN or other identifier) and sends 315 mileage or other pertinent data. Mileage is useful as both a reference point (to base how much new data is provided since a last report) and as a parameter for maintenance recommendations.

An illustrative SMT 303 receives 321 the various transmitted vehicle data and, to the extent necessary, aggregates 323 this data with previously received vehicle data. Different vehicle repairable systems may have different data sets associated therewith, and these data sets can be reset or modified based on when maintenance actually occurs. For example, brakes may be replaced at 25,000 miles, and tires at 20,000 miles (generically). At the 20,000 mile interval, when the tires are replaced, new tires are added, so data pertaining to recommended tire maintenance can be reset, but the brakes (having not yet been replaced) still have data stemming from mile 0 associated therewith.

The process can use aggregated vehicle data (since a last maintenance appointment or over the life of the vehicle, for example) to classify 325 the vehicle into a broad usage category. Instead of modeling a very specific profile for each vehicle, this process considers vehicles as falling into broader categories, which may have certain highly-recommended maintenance procedures associated therewith. For example, high-usage vehicles with frequent dusty travel may receive air filter replacement recommendations every 1500 miles. This does not mean that any particular vehicle necessarily needs a filter replacement, but rather that this recommendation has been observed to be useful for a threshold percentage of vehicles classified as such.

The process, following classification of the vehicle, checks 327 maintenance recommendations for the classification(s) and determines 329 if current vehicle parameters meet any recommended maintenance. In the example above using air filters, for example, the process would determine that high-usage frequently-dusty vehicles need new filters every 1500 miles, and then determine that the present vehicle only had driven 750 miles since the last replacement (for example). This would result in a conclusion that no filter maintenance was recommended for this vehicle at the present time. If the vehicle had driven 1600 miles since the last replacement, the process would issue a recommendation.

It is worth noting that vehicle usage may change over time, resulting in reclassification of a vehicle. The perpetual data feed and the possibility of resetting classifications at time of maintenance allow for dynamic reclassification of a vehicle. It is even possible to classify individual vehicle systems (e.g., tires, brakes, etc) such that a not-yet-replaced system is associated with a lifetime class (0 miles to present mileage) whereas a replaced system is associated with a class-observed-since-replacement. This allows the system to adapt to changing usage patterns without overlooking an older system that may still be impacted by previous usage.

In this example, the when the SMT process determines that a maintenance recommendation exists, the process branches to pushing 331 data to a user-device 307 (e.g. smart phone) and pushing 333 data to a dealer system 305.

Figure 4:
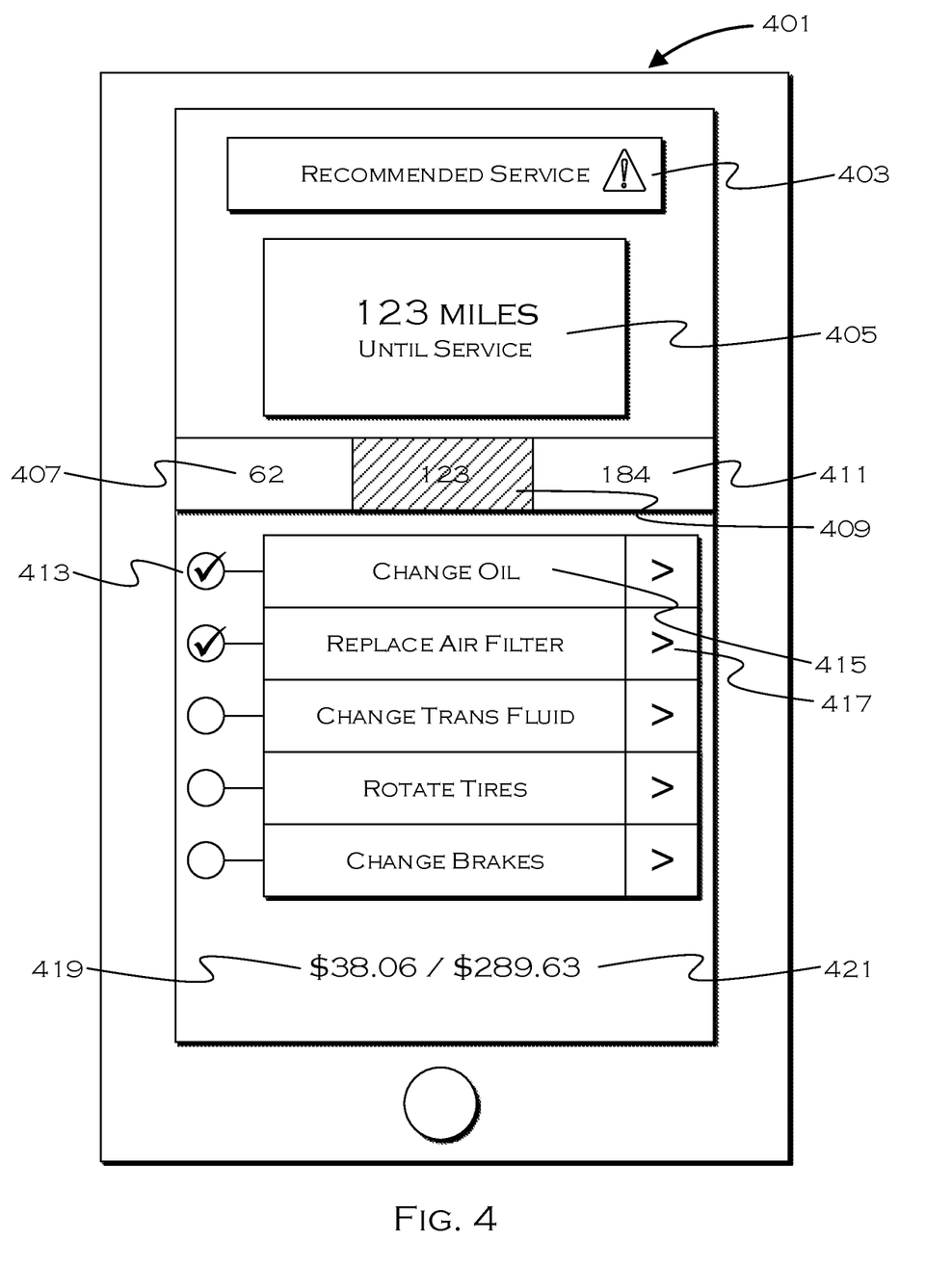
FIG. 4 shows an illustrative example of a mobile device display.

The user device process receives 341 the maintenance recommendation and may display 343 the recommendation(s) for a user to consider (as shown in FIG. 4). If the user elects any of the recommended maintenance 345, the process may provide 347 an opportunity for the user to schedule the maintenance. This option may exist on the smart device in the background until such time as an appointment is scheduled or the maintenance is performed (or the user clears the selections). The process could also use the recommendations to issue periodic alerts on the device through application notifications, and the severity, timing and data in the alerts could depend on the criticality of the recommendation, for example.

On the dealer side, the process also receives 351 the recommendation and waits until the customer has scheduled 353 an appointment to address at least one issue. Once the appointment has been scheduled, the process pulls 355 current warranty data and populates 357 a user file. This data can also be used to send other options or suggestions back to a user device. This interaction can serve as a proxy for what typically occurs when a user arrives, and may allow the dealership to confirm maintenance selections and determine 359 if parts are needed before the user ever arrives, which could speed along the entire maintenance process. The dealer also has an opportunity to upsell or cross-sell at this point (e.g., if you elect to buy 2 new premium tires, we will include 1 free rotation; or if you purchase an oil change, you can upgrade the oil type to a premium synthetic for 50% off if you purchase the option now). To the extent that any parts are needed and/or confirmed by the customer, the process can also order 361 the parts.

FIG. 4 shows an illustrative example of a mobile device display. In this example, the device 401 has received recommended service data based on an SMT analysis of the vehicle usage conditions. An alert 403 appears at the top of the window, to the extent an alert exists. This display also includes a distance until service is recommended 405.

In this example, the process also shows a usage-based variable parameter bar. This bar represents the distances until maintenance would be recommended based on low 407, medium 409 and high 411 usage. The shaded area covering part of 409 and part of 411 represents that this is a recommendation based on a medium usage vehicle shifted slightly towards high usage. As the feedback is provided over time, the movement of the shaded area lets the customer observe how driving frequency, conditions and behavior affects the category of vehicle recommendation, and can allow the driver to change behavior or usage depending on whether maintenance costs are an issue. For example, a college student may shift behavior to avoid maintenance costs, and an On-Demand Taxi driver (such as several app-driven services allow) may be able to factor the observed variation in maintenance recommendations/costs based on excessive usage into a cost-benefit analysis.

The display also includes a list 415 of all the recommended services that are presently needed or recommended. An arrow 417 can be used to expand a category to see options, further recommendations, basis for recommendation, etc. A check box 413 or other feature allows for selection of a particular option. The cost 419 of selected options and a total cost 421 of all options is displayed as well.

Once the user submits selected options, the data can be transmitted to a dealer/service center and the dealer can use that data to pre-order any necessary parts or issue any cross-selling/up-selling offers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
   wirelessly receive vehicle usage data;
   aggregate received data over time;
   classify vehicle usage into a predetermined category based on the aggregated received data, wherein the predetermined categories include light usage, medium usage and high usage, based on at least one of a total amount of vehicle usage in terms of at least one of time or distance, the categories corresponding to predetermined amounts of vehicle usage determined based on the vehicle usage data;
   access a set of maintenance recommendations associated with the predetermined category; and
   send a maintenance recommendation based on a correspondence between the aggregated received data and a value associated with one of the maintenance recommendations.

2. The system of claim 1, wherein the processor is configured to send the maintenance recommendation to a customer smart phone application.

3. The system of claim 1, wherein the processor is configured to send the maintenance recommendation to a dealer service system.

4. The system of claim 1, wherein the correspondence includes vehicle mileage being above a maintenance recommendation threshold associated with the one of the maintenance recommendations.

5. The system of claim 4, wherein different vehicle systems have different mileage values saved as associated therewith, the mileage values representing mileage since last servicing.

6. The system of claim 1, wherein the correspondence includes a usage time value being above a maintenance recommendation threshold associated with the one of the maintenance recommendations.

7. The system of claim 1, wherein:
the wireless receipt of vehicle usage data, includes vehicle GPS coordinates through which a vehicle, from which the usage data was received, travels;
the processor is further configured to:
determine which of the GPS coordinates correspond to one or more environmental conditions associated with the GPS coordinate at the time the vehicle was at the GPS coordinate;
determine at least one of a percentage of time or distance the vehicle was driven under a given environmental condition as indicated by the GPS data, based on the aggregation of received data over time;
further classify vehicle usage into another predetermined category based on the determined at least one of the percentage of time or distance the vehicle was driving in a given external environmental condition, such that the classification identifies usage correlated to the given environmental condition;
access a set of additional maintenance recommendations associated with the another predetermined category; and
send a maintenance recommendation for the vehicle based on a correspondence between the aggregated received data related to usage under the given environmental condition and a value, related to the given environmental condition and associated with one of the maintenance recommendations such that the one of the maintenance recommendations pertains to vehicles driven a threshold of either time or distance under the environmental conditions.

8. The system of claim 7, wherein the environmental conditions include an off-road condition determined on the basis that the GPS coordinates do not correspond to a known road.

9. The system of claim 7, wherein the environmental conditions include a weather-related condition, determined on the basis that the GPS coordinates correspond to a given weather condition known to exist at the GPS coordinates at a time when the vehicle was located at the GPS coordinates.

10. A system comprising:
a processor configured to:
wirelessly receive vehicle usage data, including at least oil life measured by a vehicle from which the usage data was received;
aggregate received data over time to determine at least a mean oil life slope based at least on the oil life received as part of the vehicle usage data;
classify vehicle usage into a predetermined category based on the aggregated received data;
access a set of maintenance recommendations associated with the predetermined category; and
send a maintenance recommendation based on a correspondence between the aggregated received data and a value associated with one of the maintenance recommendations.

* * * * *